(12) United States Patent
Mieno et al.

(10) Patent No.: US 9,768,886 B2
(45) Date of Patent: Sep. 19, 2017

(54) OPTICAL RECEIVER

(71) Applicant: MITSUBISHI ELECTRIC CORPORATION, Chiyoda-ku (JP)

(72) Inventors: Mitsuko Mieno, Chiyoda-ku (JP); Tsuyoshi Yoshida, Chiyoda-ku (JP); Hiroaki Shintaku, Chiyoda-ku (JP); Shusaku Hayashi, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/112,490

(22) PCT Filed: Feb. 13, 2014

(86) PCT No.: PCT/JP2014/053332
§ 371 (c)(1),
(2) Date: Jul. 19, 2016

(87) PCT Pub. No.: WO2015/121946
PCT Pub. Date: Aug. 20, 2015

(65) Prior Publication Data
US 2016/0337044 A1 Nov. 17, 2016

(51) Int. Cl.
*H04B 10/61* (2013.01)
*H04J 14/02* (2006.01)
(Continued)

(52) U.S. Cl.
CPC ... *H04B 10/6165* (2013.01); *H04B 10/07953* (2013.01); *H04B 10/6164* (2013.01); *H04J 14/02* (2013.01); *H04J 14/06* (2013.01)

(58) Field of Classification Search
None
See application file for complete search history.

(56) References Cited

U.S. PATENT DOCUMENTS 5,548,434 A * 8/1996 Shimonaka ........ H04B 10/1125
398/158
6,075,829 A * 6/2000 Hayashi ............... H03B 5/1203
329/304
(Continued)

FOREIGN PATENT DOCUMENTS

JP 2002-207230 A 7/2002
JP 2009-49613 A 3/2009
(Continued)

OTHER PUBLICATIONS

International Search Report issued Mar. 18, 2014 in PCT/JP2014/053332 filed Feb. 13, 2014.

*Primary Examiner* — Oommen Jacob
(74) *Attorney, Agent, or Firm* — Oblon, McClelland, Maier & Neustadt, L.L.P.

(57) ABSTRACT

An optical receiver including: a phase modulation unit that generates local oscillation light and modulates a phase of the local oscillation light; a coherent detection unit that causes a received optical signal and the local oscillation light phase-modulated by the phase modulation unit to interfere and converts the optical signal to an electrical signal; a polarization separation/adaptive equalization unit that performs polarization separation and adaptive equalization on the electrical signal after coherent detection; and decoding units that decode the polarization-separated electrical signals outputted from the polarization separation/adaptive equalization unit.

3 Claims, 7 Drawing Sheets

(51) Int. Cl.
*H04J 14/06* (2006.01)
*H04B 10/079* (2013.01)

(56) References Cited

U.S. PATENT DOCUMENTS

| | | | |
|---|---|---|---|
| 9,258,065 B2* | 2/2016 | Salsi | H04B 10/61 |
| 2003/0063285 A1* | 4/2003 | Pering | G01J 9/04 |
| | | | 356/484 |
| 2004/0208643 A1* | 10/2004 | Roberts | H04B 10/61 |
| | | | 398/186 |
| 2006/0120733 A1* | 6/2006 | Tucker | H04B 10/60 |
| | | | 398/204 |
| 2006/0140319 A1* | 6/2006 | Eldredge | H04L 7/033 |
| | | | 375/371 |
| 2008/0145066 A1* | 6/2008 | Hoshida | H04B 10/61 |
| | | | 398/205 |
| 2009/0047030 A1* | 2/2009 | Hoshida | H04B 10/60 |
| | | | 398/205 |
| 2011/0318021 A1* | 12/2011 | Zhou | H04B 10/611 |
| | | | 398/202 |
| 2012/0155890 A1* | 6/2012 | Zhou | H04B 10/6165 |
| | | | 398/208 |
| 2016/0006538 A1* | 1/2016 | Yoshida | H04B 10/532 |
| | | | 398/65 |
| 2016/0337044 A1* | 11/2016 | Mieno | H04B 10/07953 |

FOREIGN PATENT DOCUMENTS

| | | |
|---|---|---|
| JP | 2012-119759 A | 6/2012 |
| WO | 2010/033402 A1 | 3/2010 |

\* cited by examiner

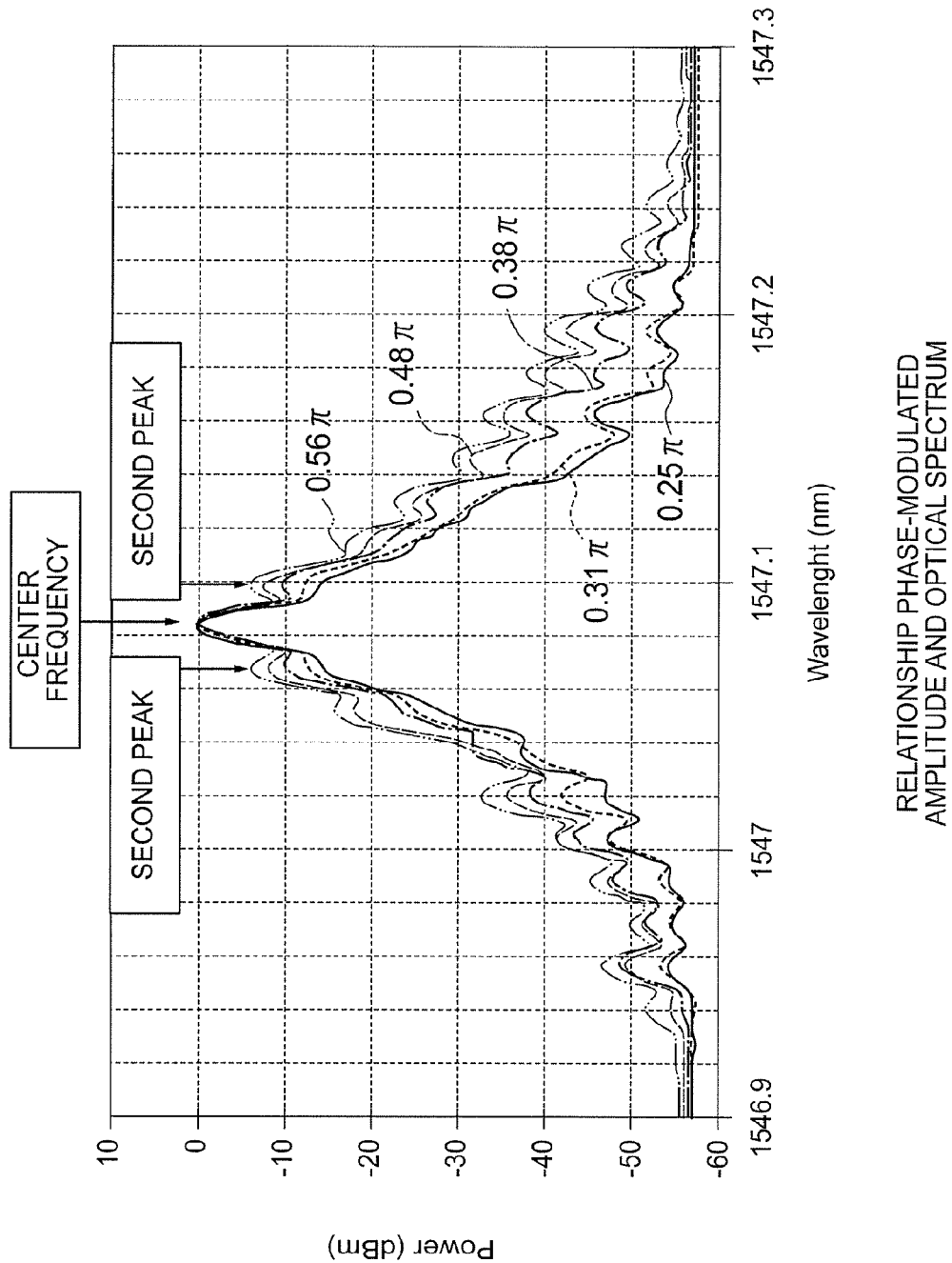

OPTICAL RECEIVER

TECHNICAL FIELD

This invention relates to an optical receiver, and more particularly, to an optical receiver that relies on a digital coherent scheme.

BACKGROUND ART

Simply increasing wavelength multiplexing numbers and laying new optical transmission networks is insufficient in terms of meeting the demands involved in realizing large-capacity optical transmission. Accordingly, transmission speeds have increased from conventional 10 Gbps to 40 Gbps and 100 Gbps (see for instance Patent Literature 1 and 2).

With increasing speeds, however, transmission penalties such as distortion of optical signal waveforms caused by wavelength dispersion or polarization mode dispersion in the optical fiber of the communication channel become serious, in particular in optical transmission systems where long-distance transmission is carried out.

In order to solve the above problem, digital coherent communication schemes are resorted to that allow compensating wavelength dispersion and polarization mode dispersion in the electrical domain, and that allow supporting various multilevel modulation schemes, by providing a digital signal processor (DSP) on the reception side.

Multilevel modulation such as DP-QPSK (Dual Polarization Quadrature Phase-Shift Keying) modulation and DP-BPSK (Dual Polarization Binary Phase-Shift Keying) modulation, which are digital coherent schemes, has been used in recent years.

Other known schemes involve doubling the number of transmitted bits per symbol, relying on a polarization multiplexing scheme, in order to realize wavelength multiplexing of higher density that enables long-distance transmission. In polarization multiplexing schemes, independent transmission signals are respectively allocated to two orthogonal polarization components.

CITATION LIST

Patent Literature

[PTL 1] JP 2012-119759 A
[PTL 2] WO 2010/033402 A1

SUMMARY OF INVENTION

Technical Problem

As described above, transmission penalties incurred in long-distance transmission can be reduced by relying on a digital coherent communication scheme that utilizes a DSP.

Polarization-separation multiplexing optical transmission systems, however, had a problem in that when an adaptive equalization filter is used that is based on an ordinary envelope constant modulus algorithm (CMA), the adaptive equalization filter exhibits erroneous convergence, and polarization separation cannot be carried out stably. A further problem was that residual delay interference in the same polarization, after polarization separation in the adaptive equalization filter, gave rise to anomalies in frame synchronization.

Erroneous convergence in an adaptive equalization filter will be explained next. FIG. 1 is an overall configuration diagram of an optical transmitter-receiver relying on ordinary polarization-multiplexed binary phase modulation scheme. As illustrated in FIG. 1, an optical transmitter 101 outputs modulated light. The modulated light is transmitted by an optical transmission unit 107. After transmission, the modulated light is inputted to an optical receiver 108, which performs reception processing. Reception processing includes detection, polarization separation, adaptive equalization and decoding. The optical transmitter 101 is made up of a light source 102, a pulse carver 103, an X-polarization I/Q modulation unit 104, a Y-polarization I/Q modulation unit 105 and a polarization multiplexing unit 106. The optical receiver 108 is made up of a coherent detection unit 110, a local oscillation light source 109, a polarization separation/adaptive equalization unit 111, a decoding unit 112 and a decoding unit 113. An adaptive equalization filter is provided in the polarization separation/adaptive equalization unit 111 of the optical receiver 108. An output signal amplitude $|y(k)|$ of an output signal $y(k)$ of the adaptive equalization filter is rendered constant under a condition where there is satisfied $y(k)=\cos(\phi)s_{i1}(k)+j\sin(\phi)s_{i2}(k)$, where $s_{i1}(k)\{1, -1\}$ is an X-polarization signal and $s_{i2}(k)\{1, -1\}$ is an Y-polarization signal. Herein $\phi=0, \pi/2, \pi, -\pi/2$ correspond to states in which polarization separation is possible. States other than that do not allow for polarization separation (i.e., states in which there is residual delay interference in the same polarization, and convergence to $\phi=0, \pi/2, \pi$ or $-\pi/2$ is not possible). States in which polarization separation is not possible are referred to as "erroneous convergence".

In some instances the signal light level in an optical transmitter drops through modulation of the phase of signal light. In this case, the control sensitivity of signal light that is used in automatic bias control may drop, and automatic bias control may exhibit deviation. Although is possible to increase delay interference detection sensitivity, there is however a trade-off relationship between delay interference detection sensitivity and the bit error rate (BER) calculated after reception of the signal light. Accordingly, it is difficult to realize both BER stability and optimization when increasing delay interference detection sensitivity.

For instance Patent Literature 1 discloses a method in which polarization separation is carried out normally. In Patent Literature 1, normal polarization separation is carried out through polarization multiplexing of a frequency-shifted optical signal in such a manner that the center frequencies of X-polarization and Y-polarization differ from each other by a predetermined amount. The method of Patent Literature 1 was however problematic in that, although depending also on the extent of the frequency shift, signal degradation occurred on account of optical filtering of transmission light by components such as a WSS.

In Patent Literature 2, a control signal for minimization of BER measured in a receiver is transmitted from the receiver to a transmitter, to minimize as a result the error count in the receiver. In the method of Patent Literature 2, however, a control signal for minimizing BER had to be transmitted to a transmitter, which was problematic in that BER minimization processing could not be carried out on the reception side.

The present invention has been made in view of the above-mentioned problems, and therefore has an object to provide an optical receiver in which BER is reduced by stabilizing polarization separation after coherent detection, through phase modulation of local oscillation light on the optical receiver side.

Solution to Problem

The present invention is an optical receiver for receiving an optical signal, the optical receiver being provided with: a phase modulation unit that generates local oscillation light, modulates a phase of the local oscillation light, and outputs the light; a coherent detection unit that causes the received optical signal and the local oscillation light, which has been phase-modulated by the phase modulation unit, to interfere and converts the optical signal to an electrical signal; a polarization separation unit that polarization-separates the electrical signal outputted from the coherent detection unit; and a decoding unit that decodes the polarization-separated electrical signals outputted from the polarization separation unit.

Advantageous Effects of Invention

In the present invention, local oscillation light is phase-modulated on the optical receiver side, and hence polarization separation after coherent detection can be stabilized, and BER can be reduced.

BRIEF DESCRIPTION OF DRAWINGS

FIG. 7 is a diagram illustrating a relationship between phase-modulated amplitude and optical spectrum.

DESCRIPTION OF EMBODIMENTS

Embodiment 1

Figure 1:
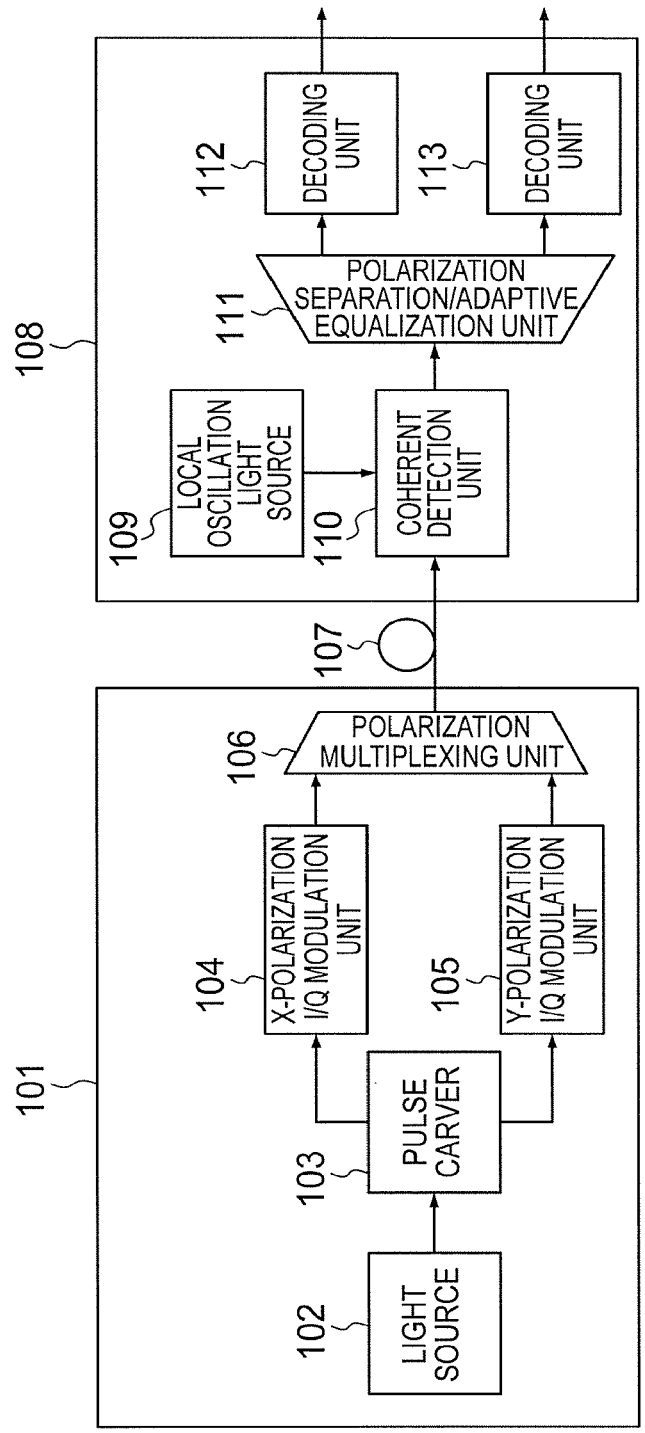
FIG. 1 is a configuration diagram illustrating the configuration of a related-art optical transmitter-receiver.
Figure 2:
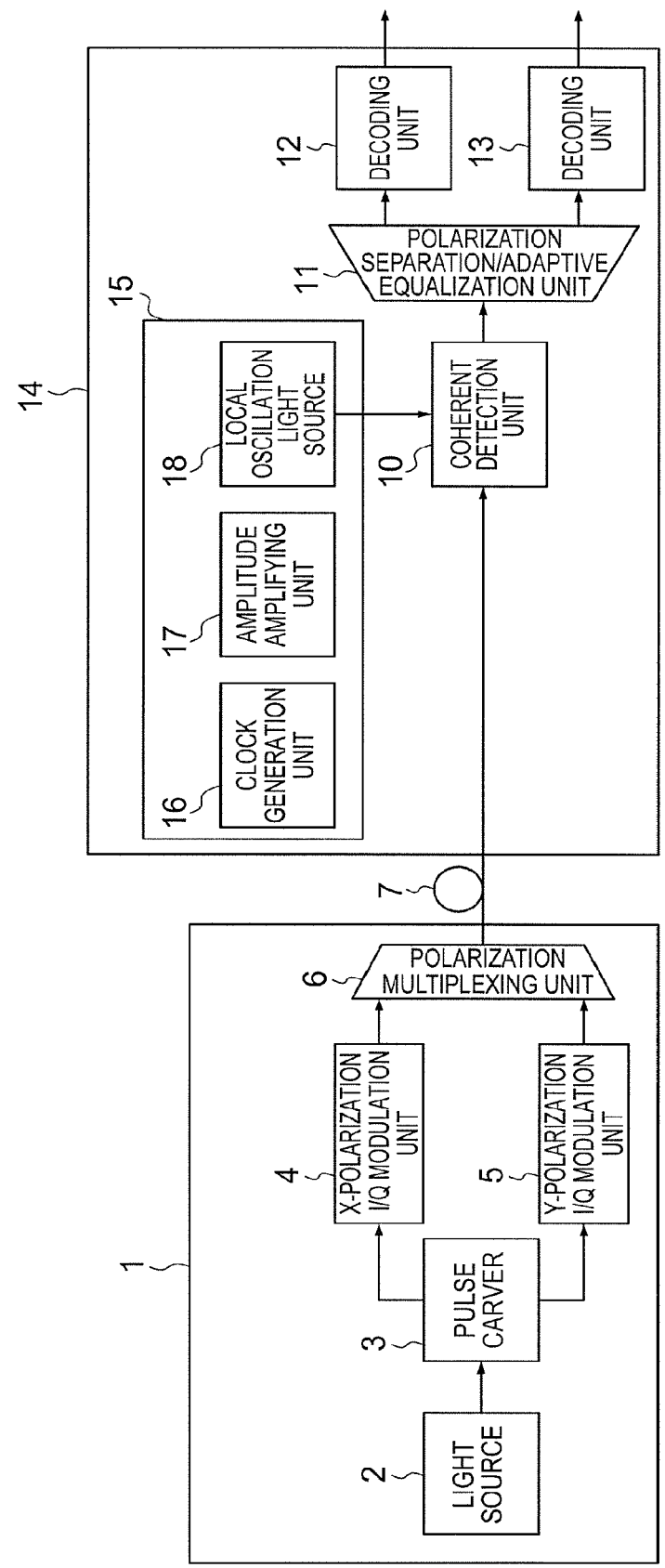
FIG. 2 is a configuration diagram illustrating an optical transmitter-receiver according to Embodiment 1 of the present invention.

FIG. 2 is a configuration diagram illustrating the overall configuration of an optical transmitter-receiver according to Embodiment 1 of the present invention. As illustrated in FIG. 2, an optical transmitter 1 firstly outputs modulated light. The optical signal is transmitted to an optical transmission unit 7. The optical signal after transmission is inputted to an optical receiver 14, which performs reception processing.

The optical transmitter 1 is made up of a light source 2, a pulse carver 3, an X-polarization I/Q modulation unit 4, a Y-polarization I/Q modulation unit 5 and a polarization multiplexing unit 6. The optical transmission unit 7 is made up of an optical fiber. The optical receiver 14 is made up of a coherent detection unit 10, a phase modulation unit 15, a polarization separation/adaptive equalization unit 11, a decoding unit 12 and a decoding unit 13. The phase modulation unit 15 is made up of a clock generation unit 16, an amplitude amplifying unit 17 and a local oscillation light source 18.

The light source used in the local oscillation light source 18 need not generate a fast optical signal, of several GHz or higher, and hence there can be used an inexpensive and compact direct modulated light source, instead of an external modulated light source. In the optical receiver 14 of the present embodiment, $\pi/4$ phase modulation is performed on the local oscillation light that is inputted from the local oscillation light source 18 to the coherent detection unit 10, using a clock signal having a frequency of 1/10 of the baud rate in the decoding units 12, 13. As a result, the relative phase relationship between coherently detected optical signals becomes random, and hence polarization separation can be carried out normally, without the occurrence of delay interference within a same polarization, after polarization separation. The baud rate is a value denoting how many times per second an electrical signal (digital data) can be modulated and demodulated.

The respective structures provided in the optical transmitter 1 will be explained next.

The light source 2 outputs unmodulated light.

The pulse carver 3 performs RZ (Return-to-Zero) pulsed modulation on the unmodulated light outputted from the light source 2. The light having undergone RZ pulsed modulation is separated to X-polarization and Y-polarization, and the separated X-polarization and Y-polarization are inputted to the X-polarization I/Q modulation unit 4 and the Y-polarization I/Q modulation unit 5, respectively.

The X-polarization I/Q modulation unit 4 differentially encodes the inputted X-polarization, and duplicates the differentially encoded X-polarization for the I-axis and the Q-axis, to generate thereby two-lane signals XI, XQ.

The Y-polarization I/Q modulation unit 5 differentially encodes the inputted Y-polarization, and duplicates the differentially encoded Y-polarization for the I-axis and the Q-axis, to generate thereby two-lane signals YI, YQ.

The polarization multiplexing unit 6 multiplexes, in orthogonal polarization, the two-lane signals (XI, XQ) generated by the X-polarization I/Q modulation unit 4 and the two-lane signals (YI, YQ) generated by the Y-polarization I/Q modulation unit 5, to generate a polarization-multiplexed binary phase modulated signal. The polarization-multiplexed binary phase modulated signal is outputted to the optical transmission unit 7.

The respective structures provided in the optical receiver 14 will be explained next.

The phase modulation unit 15 generates local oscillation light that oscillates at a frequency of 1/10 of the baud rate in the optical transmitter 1. The phase modulation unit 15 generates a clock signal of a frequency of 1/10 of the baud rate in the decoding units 12, 13. The local oscillation light is subjected to $\pi/4$ phase modulation using the clock signal as a signal for phase modulation.

The local oscillation light having been phase-modulated as described above and outputted from the phase modulation unit 15 is inputted to the coherent detection unit 10. The polarization-multiplexed binary phase modulated signal transmitted by the optical transmission unit 7 is also inputted to the coherent detection unit 10. Through coherent detection, the coherent detection unit 10 converts the polarization-multiplexed binary phase modulated signal to an electrical signal. Specifically, the coherent detection unit 10 measures the amplitude and phase of the polarization-multiplexed binary phase modulated signal, through interference between the local oscillation light and the polarization-multiplexed binary phase modulated signal, and extracts the polarization-multiplexed binary phase modulated signal as an electrical signal. The extracted electrical signal is amplified, as needed. To achieve interference, the coherent detection unit 10 causes the local oscillation light and the polarization-multiplexed binary phase modulated signal to interfere in orthogonal polarization (Xr/Yr) units and orthogonal phase (Ir/Qr) units. The coherent detection unit 10 generates thus four-lane electrical signals (XrIr, XrQr, YrIr, YrQr) being in a state resulting from mixing of signals of dual polarizations and I/Q-axes, through coherent detection. The coherent detection unit 10 moreover performs analog digital conversion on the electrical signals (XrIr, XrQr, YrIr, YrQr) to obtain four-lane digital signals, which are then outputted to the polarization separation/adaptive equalization unit 11.

Figure 6:
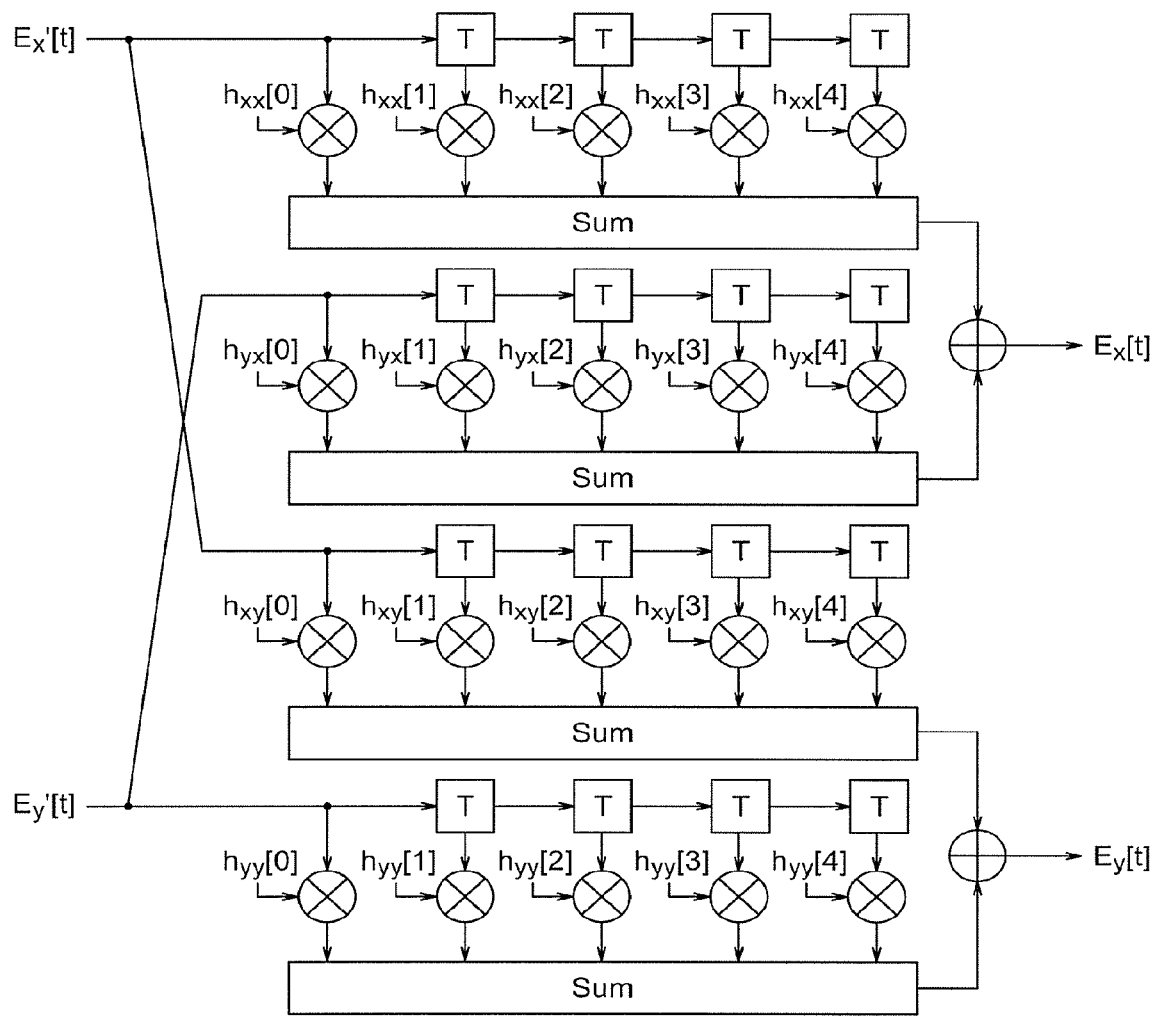
FIG. 6 is a configuration diagram illustrating the configuration of a polarization separation/adaptive equalization unit in the optical transmitter-receiver according to Embodiment 1 of the present invention.

The polarization separation/adaptive equalization unit 11 performs orthogonal polarization separation and adaptive equalization, for instance relying on an envelope constant modulus algorithm (CMA), on the basis of the four-lane digital signals outputted from the coherent detection unit 10. FIG. 6 illustrates the internal configuration of the polarization separation/adaptive equalization unit 11. The example illustrated in FIG. 6 is a butterfly-type finite impulse response (FIR) filter. Using the FIR filter illustrated in FIG. 6, the polarization separation/adaptive equalization unit 11 separates an Xr polarization complex signal Ex'[t] and an Yr polarization complex signal Ey'[t] into an X-polarization signal Ex[t] and a Y-polarization signal Ey[t], being dual polarization components at the time of transmission. The Xr polarization complex signal Ex'[t] is a complex signal, made up of XrIr as the real part and XrQr as the imaginary part, from among the four-lane signals that are inputted from the coherent detection unit 10. The Yr polarization complex signal Ey'[t] is a complex signal, made up of YrIr as the real part and YrQr as the imaginary part, from among the four-lane signals that are inputted from the coherent detection unit 10. Generally, the delay length of one tap in the FIR filter is designed to be equal to or shorter than half the symbol time, and the tap length to be equal to or longer than 10. To simplify figure, the delay length of one tap in FIG. 6 has been notated as one symbol, with tap length 5. The tap coefficients hpq[k] (p={x, y}, q={x, y}, k={0, 1, 2, 3, 4}) of the FIR filter are sequentially updated in accordance with an adaptive algorithm such as CMA. The polarization separation/adaptive equalization unit 11 outputs the X-polarization signal and the Y-polarization signal, obtained through polarization separation/adaptive equalization, to the decoding units 12 and 13, respectively. The polarization separation/adaptive equalization unit 11 is thus configured so that, in a case where the adaptive equalization filter has a plurality of taps, randomness arises in the arrangement (phase) in a relative phase relationship between an axis on which there is disposed a signal at a given point in time and an axis on which there is disposed a signal spaced therefrom by a given lapse of time. Interference occurs in the same polarization, as a result of passage through the adaptive equalization filter, if the relative phase relationship between the axis on which there is disposed a signal at a given point in time, and the axis on which there is disposed a signal removed spaced therefrom by a given lapse of time, is always the same (i.e., is non-random). By contrast, interference within a same polarization can be prevented when the relative phase relationship is random.

The X-polarization signal having undergone polarization separation/adaptive equalization is inputted from the polarization separation/adaptive equalization unit 11 to the decoding unit 12. The decoding unit 12 decodes the X-polarization signal and outputs the decoding result to the outside. The decoding unit 12 calculates the BER after the decoding processing.

The Y-polarization signal having undergone polarization separation/adaptive equalization is inputted from the polarization separation/adaptive equalization unit 11 to the decoding unit 13. The decoding unit 13 decodes the Y-polarization signal and outputs the decoding result to the outside. The decoding unit 13 calculates the BER after the decoding processing.

The respective structures provided in the phase modulation unit 15 will be explained next.

The clock generation unit 16, which is made up of a clock generation circuit (clock generation IC) generates a clock signal of a frequency of 1/10 of the baud rate.

The amplitude amplifying unit 17 generates a signal for phase modulation through amplification of the amplitude of the clock signal. The signal for phase modulation is outputted to the local oscillation light source 18.

The local oscillation light source 18 generates local oscillation light that oscillates at a frequency of 1/10 of the baud rate in the optical transmitter 1. The local oscillation light source 18 subjects the local oscillation light to $\pi/4$ phase modulation, using the signal for phase modulation outputted from the amplitude amplifying unit 17. The local oscillation light source 18 outputs the phase-modulated local oscillation light to the coherent detection unit 10.

The operation of the optical transmitter-receiver according to the present embodiment will be explained next with reference to FIG. 2.

In the optical transmitter 1, firstly, the light source 2 generates unmodulated light, and outputs the light to the pulse carver 3. The pulse carver 3 subjects the light to RZ pulsed modulation, to separate the light into X-polarization and Y-polarization. The pulse carver 3 inputs the generated X-polarization and Y-polarization to the X-polarization I/Q modulation unit 4 and the Y-polarization I/Q modulation unit 5, respectively. In the X-polarization I/Q modulation unit 4 and the Y-polarization I/Q modulation unit 5, the X-polarization and Y-polarization, respectively, are differentially encoded, and the differentially encoded X-polarization and Y-polarization are duplicated for the I-axis and the Q-axis, to generate as a result four-lane signals XI, XQ, YI and YQ. These four-lane signals are inputted to the polarization multiplexing unit 6. The polarization multiplexing unit 6 multiplexes the four-lane signals in orthogonal polarization, and outputs the generated polarization-multiplexed binary phase modulated signal to the optical transmission unit 7.

The optical transmission unit 7 transmits the polarization-multiplexed binary phase modulated signal, outputted from the optical transmitter 1, to the optical receiver 14.

In the optical receiver 14, the polarization-multiplexed binary phase modulated signal transmitted by the optical transmission unit 7 is inputted to the coherent detection unit 10. The local oscillation light from the phase modulation unit 15 is also inputted to the coherent detection unit 10. The coherent detection unit 10 performs coherent detection through interference between the polarization-multiplexed binary phase modulated signal and the local oscillation light. As described above, the local oscillation light inputted to the coherent detection unit 10 has been subjected to $\pi/4$ phase modulation using a clock signal of frequency of 1/10 of the baud rate in the phase modulation unit 15. In order to randomize the phase of the local oscillation light it is necessary to drive an optical modulator according to a sinusoidal or triangular electrical waveform, not a square waveform. Depending on the characteristics of the clock generation circuit, however, a square waveform but not a sinusoidal or triangular waveform is often generated, when the modulation frequency is low, as the electrical driving waveform. In this case the modulated amplitude after modulation cannot be estimated, and it cannot thus be verified that modulation is accurate. Polarization separation cannot be carried out normally as a result. In order to address this issue, a low-pass filter having a narrow passband is required, which entails a complex control system. When the modulation frequency is high, conversely, there cannot be secured sufficient length of phase modulation periods with respect to tap length in the adaptive equalization filter, which is likely to result in erroneous convergence in the adaptive equalization filter. In the present embodiment, therefore, $\pi/4$ phase modulation of the local oscillation light is performed in the phase modulation unit 15 using a clock signal of frequency of 1/10 of the baud rate. As a result, it becomes possible to prevent erroneous convergence in the adaptive equalization filter of the polarization separation/adaptive equalization unit 11, and to carry out polarization separation stably.

The electrical signals outputted from the coherent detection unit 10 are four-lane signals in a state resulting from mixing of signals of dual polarization and I/Q-axes, as described above. In the polarization separation/adaptive equalization unit 11, these four-lane electrical signals are separated using an adaptive equalization filter equipped with CMA. Erroneous convergence in the adaptive equalization filter can be prevented, and polarization separation carried out stably, by phase-modulating the local oscillation light using the above modulation frequency. In the present embodiment, two lanes in the four lanes are indefinite signals; in order to avoid excessive errors and continuity failure upon bulk processing of four lanes, decoding is performed separately for the four lanes XI/XQ/YI/YQ in the decoding unit 12 and the decoding unit 13 after polarization separation. After decoding, the decoding units 12, 13 perform channel estimation, dispersion compensation and error correction decoding using the respective DSPs internally provided, and calculate the BER on the basis of an error count.

As described above, the adaptive equalization filter is made up of a finite impulse response filter (FIR filter). According to the modulation rule, the greater part of relative phase in two signal axes, separated by an even symbol, is $\pi/2$, and delay interference is generated in the same polarization as a result. In order to solve the above issue, the relative phase relationship in the signal constellation axes is randomized, to gently change the optical phase over a period longer than the tap length of the adaptive equalization filter. A random four-phase appearance can be obtained, instead of that of a two-phase signal, by phase-modulating the local oscillation light according to two modulation patterns having phases differing from each other by $\pi/2$. This allows avoiding erroneous convergence in the CMA. The timings of switching between the two modulation patterns are offset from each other by half periods between X-polarization and Y-polarization; as a result, the phase relationship is randomized also between both polarizations, and the signal can be brought closer to a random four-phase signal, which is effective in terms of avoiding erroneous convergence in CMA.

In the case of long-distance transmission, polarization separation is readily carried out normally under the influence of phase disturbance, even upon occurrence of waveform distortion on account of non-linear optical effects in the optical fiber that makes up the optical transmission unit 7. By providing the phase modulation unit 15 that performs phase modulation on the local oscillation light of the optical receiver 14, there is no need for modulating to a main signal in phase modulation for performing polarization separation normally. Accordingly, modulation loss in the optical transmitter 1 is small, and it becomes possible to avoid the problem of a reduction in error signal sensitivity in automatic bias control in the pulse carver 3, the X-polarization I/Q modulation unit 4 and the Y-polarization I/Q modulation unit 5.

In the present Embodiment 1, phase modulation for stabilizing polarization separation is set to be carried out for local oscillation light, in the phase modulation unit 15 of the optical receiver 14. However, such phase modulation may be set to be carried out for the input signal (polarization-multiplexed binary phase modulated signal) that is inputted from the optical transmitter 1 to the optical receiver 14. In this case, although a polarization-independent phase modulator is necessary, erroneous convergence in the adaptive equalization filter can be likewise prevented. The principle herein is the same as that of phase modulation of local oscillation light, namely, either one of the local oscillation light and the input signal is subjected to phase-modulation, so as to make random the phase relationship between polarizations to generate random four-phase signal.

In the related-art optical receivers, as described above, erroneous convergence can occur on the reception-side adaptive equalization filter in which tap coefficients are sequentially updated according to CMA. In order to solve this problem, $\pi/4$ phase modulation is performed on local oscillation light in the optical receiver according to the present Embodiment 1. As a result of the above phase modulation, the relative phase relationship between coherently detected optical signals is randomized, and it becomes possible to prevent interference in the same polarization. It becomes accordingly possible to prevent erroneous convergence in the adaptive equalization filter, and to carry out polarization separation stably. Further, phase modulation is performed on local oscillation light, not on the oscillation light from the optical transmitter 1. Accordingly, modulation loss of signal light caused by phase modulation need not be taken into consideration, and the extinction ratio of the signal light can be preserved. It becomes also possible to prolong phase modulation to a 16-symbol period, while no external modulation need be carried out. Accordingly, an inexpensive configuration can be realized in which there is used no high-speed external modulator of 10 GHz or above.

Embodiment 2

Figure 3:
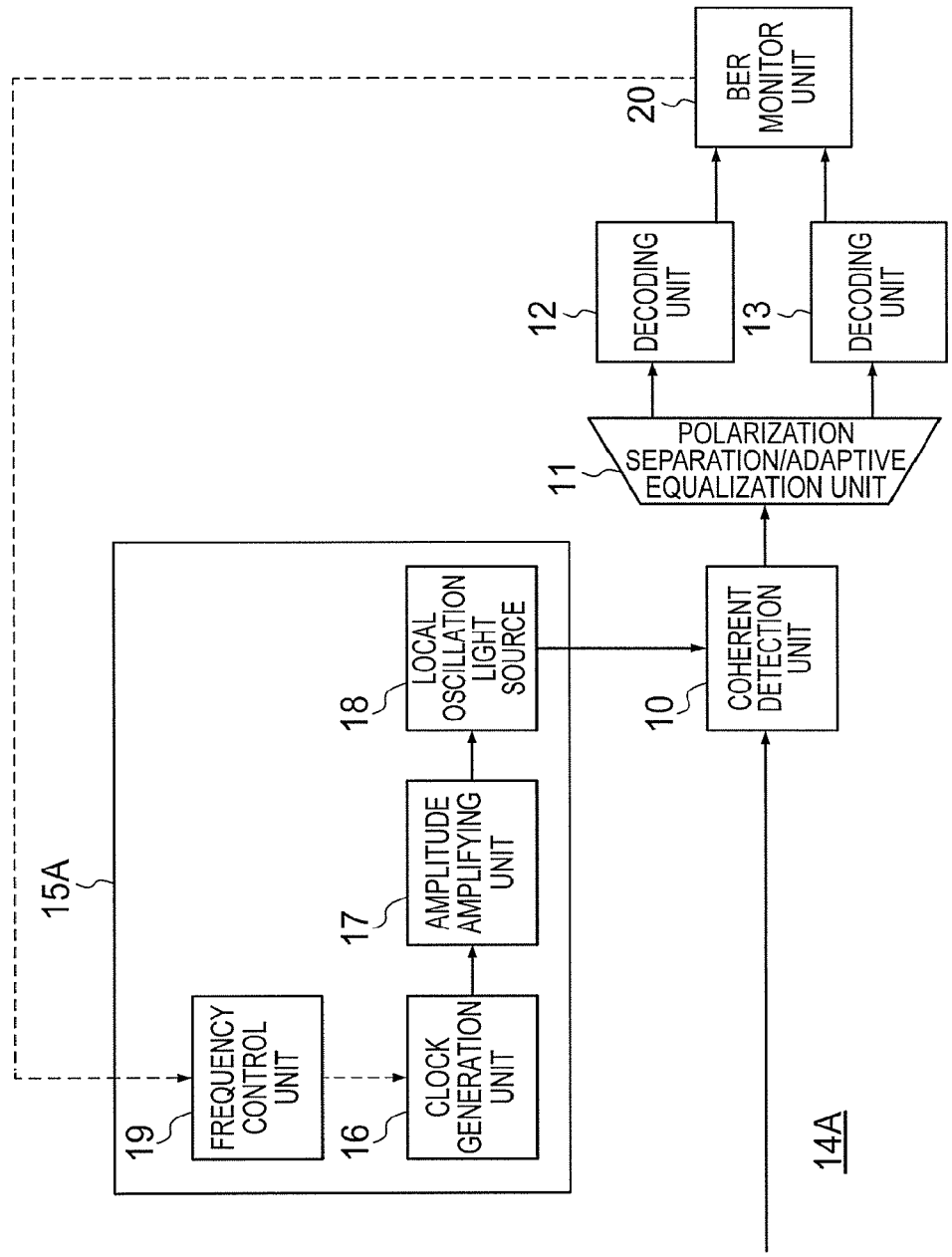
FIG. 3 is a configuration diagram of an optical receiver according to Embodiment 2 of the present invention.

FIG. 3 is a diagram illustrating an optical receiver 14A according to Embodiment 2 of the present invention. As illustrated in FIG. 3, in the optical receiver 14A according to the present Embodiment 2, a BER monitor unit 20 and a frequency control unit 19 are added to the configuration of the optical receiver 14 of Embodiment 1 illustrated in FIG. 2. Other structures are identical to those of Embodiment 1 described above, and accordingly will be denoted with the same reference symbols and will not be explained herein.

As illustrated in FIG. 3, the BER monitor unit 20 is connected to the decoding units 12, 13. The decoding units 12, 13 decode the signal outputted from the polarization separation/adaptive equalization unit 11, and calculate the BER of the respective decoded signal after the decoding process. The BER monitor unit 20 monitors the BER of the decoded signals calculated by the decoding units 12, 13. The frequency control unit 19 is provided in the phase modulation unit 15A, as illustrated in FIG. 3. The BER monitored by the BER monitor unit 20 is inputted to the frequency control unit 19. On the basis of the above BER, the frequency control unit 19 performs feedback control of the frequency of the clock signal of the clock generation unit 16, in such a manner that the fluctuation in BER approaches zero, and changes the frequency of the clock signal in such a manner that the BER stabilizes.

The configuration of the optical transmitter in the present Embodiment 2 is not illustrated in the figures, but is identical to that in FIG. 2 of Embodiment 1, and hence will not be explained herein.

The degree of stability of the BER calculated by the decoding units 12, 13 exerts also an influence on the modulation frequency of the local oscillation light source 18 that generates the local oscillation light. The modulation frequency is the frequency of the clock signal generated in the clock generation unit 16. When the standard deviation of the BER is large, depending on the frequency, it is not possible to obtain a stable transmission characteristic. To avoid this, BER is monitored by the BER monitor unit 20 that is connected to the decoding unit 12 and the decoding unit 13. The frequency control unit 19 controls the frequency of the clock signal of the clock generation unit 16, in accordance with the monitoring result of the BER monitor unit 20, and changes the frequency so that the BER stabilizes. As a result, fluctuation in the BER calculated by the decoding units 12, 13 can be minimized, and a stable transmission characteristic is obtained.

Convergence probability in the adaptive equalization filter that makes up the polarization separation/adaptive equalization unit 11 varies depending on the frequency of the signal for phase modulation. Therefore, the frequency of the clock signal generated in the clock generation unit 16 is adjusted to an optimal frequency by the BER monitor unit 20 and the frequency control unit 19. As a result, the probability of occurrence of erroneous convergence in the adaptive equalization filter can be minimized, and the degree of stability of the BER is thus increased. The probability of occurrence of erroneous convergence in the adaptive equalization filter is determined by the relative phase relationship in the signal constellation axes, but the optimal frequency varies due to, for instance, component variability. Accordingly, the feedback control circuit made up of the BER monitor unit 20 and the frequency control unit 19 illustrated in the present Embodiment 2 is effective in this regard.

Other operations are identical to those of Embodiment 1 above, and will not be explained herein.

In the optical receiver according to the present Embodiment 2, there is elicited an effect similar to that of Embodiment 1. In the present Embodiment 2, in addition, the BER calculated by the decoding units 12, 13 is monitored by the BER monitor unit 20, and the frequency of the clock signal outputted from the clock generation unit 16, being a signal for phase modulation, is controlled according to the monitoring result, to minimize as a result BER fluctuation, and enhance transmission characteristics and expand the transmission distance.

As in Embodiment 1 above, also in the optical receiver 14A of the present Embodiment 2, the input signal that is inputted to the coherent detection unit 10 from the optical transmitter may be phase-modulated. Normal polarization separation can be carried out in this case as well. A phase modulator capable of preserving polarization must however be used in this case.

Embodiment 3

Figure 4:
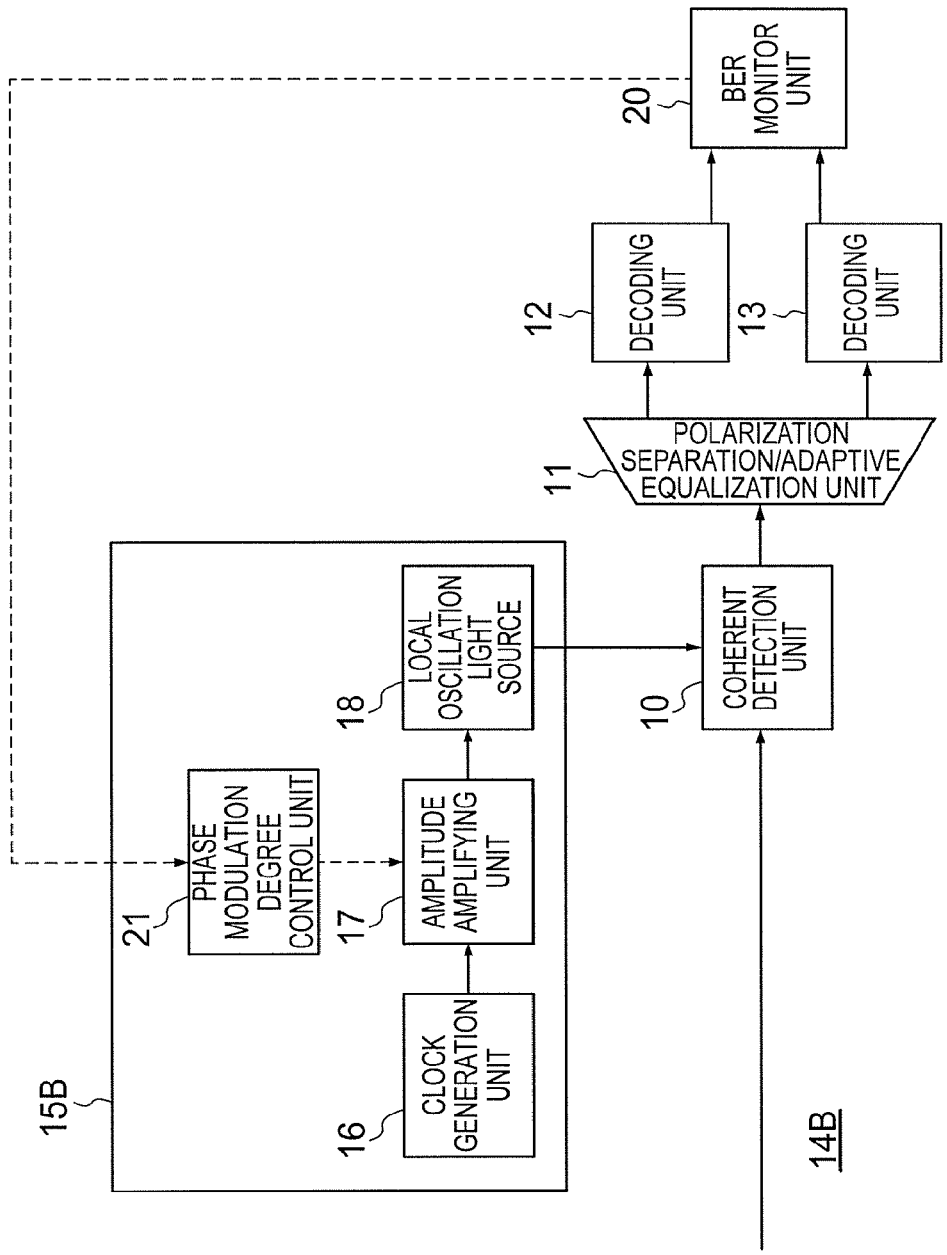
FIG. 4 is a configuration diagram of an optical receiver according to Embodiment 3 of the present invention.

FIG. 4 is a diagram illustrating an optical receiver according to Embodiment 3 of the present invention. As illustrated in FIG. 4, in an optical receiver 14B according to the present Embodiment 3 a BER monitor unit 20 and a phase modulation degree control unit 21 are added to the configuration of the optical receiver 14 of Embodiment 1 illustrated in FIG. 2. Other structures are identical to those of Embodiment 1 described above, and accordingly will be denoted with the same reference symbols and will not be explained herein.

As illustrated in FIG. 4, the BER monitor unit 20 is connected to the decoding units 12, 13. The BER monitor unit 20 monitors the BER of the decoded signals as calculated by the decoding units 12, 13.

The phase modulation degree control unit 21 is provided in the phase modulation unit 15B, as illustrated in FIG. 4. The BER monitored by the BER monitor unit 20 is inputted to the phase modulation degree control unit 21. On the basis of the above BER, the phase modulation degree control unit 21 minimizes BER by performing feedback control of the amplitude value of the amplitude amplifying unit 17, in such a manner that the value of the BER approaches a minimum value. The phase modulation degree that makes BER minimum varies depending on environmental changes and characteristic variability in components.

The configuration of the optical transmitter in the present Embodiment 3 is not illustrated in the figures, but is identical to that in FIG. 2 of Embodiment 1, and hence will not be explained herein.

The BER calculated in the decoding units 12, 13 is influenced by the amplitude of the signal for phase modulation for carrying out phase modulation in the local oscillation light source 18 i.e., is influenced by the phase modulation degree. The phase modulation degree is determined on the basis of the amplification value of the amplitude of the clock signal by the amplitude amplifying unit 17. The BER value is monitored by the BER monitor unit 20 that is connected to the decoding unit 12 and the decoding unit 13. In accordance with the monitoring result, the phase modulation degree control unit 21 determines the amplification value of the amplitude amplifying unit 17, to minimize BER. However, the phase modulation degree must be increased in order to perform polarization separation stably.

Figure 5:
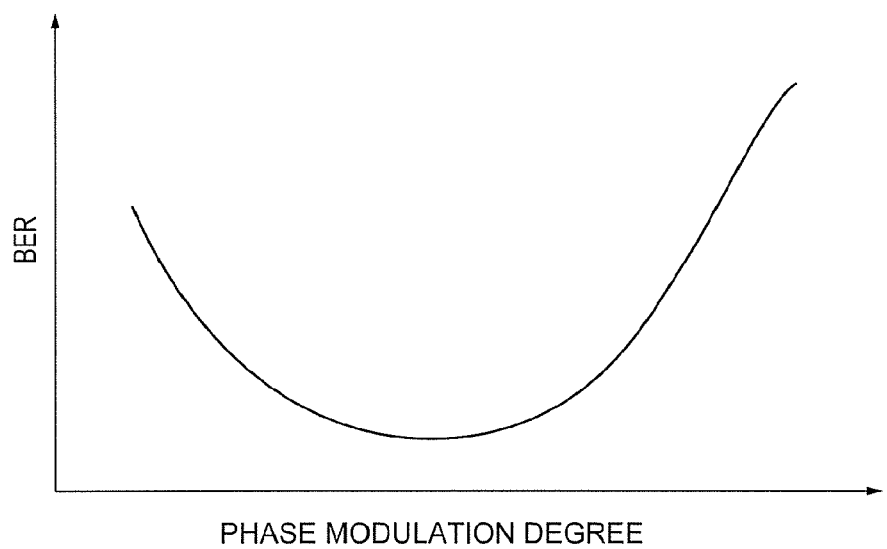
FIG. 5 is a diagram illustrating a relationship between phase modulation degree and BER according to Embodiment 3 of the present invention.

The BER decreases with decreasing phase modulation degree. However, as the phase modulation degree decreases, the probability that the adaptive equalization filter is operating normally also becomes lower. Therefore, the BER is minimized within a range that allows preserving the degree of stability of the adaptive equalization filter. The relationship between BER and phase modulation degree in the phase modulation degree control unit 21 is as illustrated in FIG. 5.

FIG. 7 is a diagram illustrating a relationship between phase-modulated amplitude and optical spectrum. The shape of the optical spectrum varies with changes in the modulated amplitude, as illustrated in FIG. 7. As the amplitude of the signal for phase modulation increases (i.e., as the phase modulation degree increases), second peaks appear on both sides the center frequency of the optical spectrum. The smaller the second peaks, the smaller the BER is, and conversely, the larger the second peaks, the larger the BER is.

By contrast, the smaller the phase modulation degree, the higher becomes the probability of erroneous convergence, without approximation to a random four-phase signal. In the optical receiver according to the present Embodiment 3, therefore, the BER calculated after decoding by the decoding units 12, 13 is monitored by the BER monitor unit 20, and the phase modulation degree is modified, by the phase modulation degree control unit 21, on the basis of the monitoring result, to minimize thereby BER while performing polarization separation stably. Minimizing thus the value of BER allows suppressing degradation of transmission characteristics and expanding the transmission distance.

Other operations are identical to those of Embodiment 1 above, and will not be explained herein.

The optical receiver according to the present Embodiment 3 elicits thus the same effect as that of Embodiment 1 as described above. In the present embodiment, in addition, the BER calculated after decoding is monitored by the BER monitor unit 20, and the phase modulation degree control unit 21 modifies the phase modulation degree of the signal for phase modulation according to the monitoring result, to minimize thereby BER while performing polarization separation stably. Minimizing thus the value of BER allows suppressing degradation of transmission characteristics and expanding the transmission distance.

The invention claimed is:

1. An optical receiver for receiving an optical signal, comprising:
   a phase modulation unit that generates local oscillation light, modulates a phase of the local oscillation light, and outputs the light;
   a coherent detection unit that causes the received optical signal and the local oscillation light, which has been phase-modulated by the phase modulation unit, to interfere and converts the optical signal to an electrical signal;
   a polarization separation unit that polarization-separates the electrical signal outputted from the coherent detection unit; and
   a decoding unit that decodes the polarization-separated electrical signals outputted from the polarization separation unit,
   wherein the phase modulation unit comprises:
      a clock generation unit that generates a clock signal having a frequency of 1/10 of the baud rate in the decoding unit; and
      a local oscillation light source that generates the local oscillation light and performs π/4 phase modulation on the local oscillation light, using the clock signal.

2. The optical receiver of claim 1, wherein the decoding unit calculates a bit error rate of the received optical signal after the decoding,
   the optical receiver further comprising a monitoring unit that monitors the bit error rate calculated in the decoding unit, wherein
   the phase modulation unit further comprises a frequency control unit that performs feedback control on the frequency of the clock signal generated by the clock generation unit, on the basis of the bit error rate monitored by the monitoring unit.

3. The optical receiver of claim 1, wherein the decoding unit calculates a bit error rate of the received optical signal after the decoding,
   the optical receiver further comprising a monitoring unit that monitors the bit error rate calculated in the decoding unit, wherein
   the phase modulation unit further comprises:
      an amplitude amplifying unit that is connected between the clock generation unit and the local oscillation light source and that amplifies the amplitude of the clock signal outputted from the clock generation unit; and
      a phase modulation degree control unit that controls a phase modulation degree of the clock signal by performing feedback control on an amplification value of the amplitude in the amplitude amplifying unit, on the basis of the bit error rate monitored by the monitoring unit.

* * * * *